UNITED STATES PATENT OFFICE.

ELLIS M. POTTER, OF NEW YORK, N. Y.

TREATING AND ROASTING COFFEE.

1,147,888. Specification of Letters Patent. Patented July 27, 1915.

No Drawing. Application filed April 20, 1914. Serial No. 833,104.

*To all whom it may concern:*

Be it known that I, ELLIS M. POTTER, a citizen of the United States, and a resident of New York, in the county of New York and State of New York, have invented certain new and useful Improvements in Treating and Roasting Coffee, of which the following is a description.

My invention relates to the treatment of coffee and more particularly to the blending or infusion into coffee of a material having reactive effects quite contrary to those produced by the caffeins of coffee.

It has long been a common practice to blend with coffee, chicory which is a well-known root which has been employed as a coffee substitute and as a blending material in conjunction with coffee. Chicory has been used in various manners but so far as known, the green chicory root has been roasted and ground to form material resembling coffee.

The general properties of chicory are known to be quite contrary to those of caffein.

Coffee, owing to the caffein acts as a powerful nervous stimulant and has a diuretic influence upon the kidneys. It increases the reflex and mental activity, but produces acidity of the stomach due to hyper-secretions of the gastric juices. It is known, in continued use, to produce biliousness and palpitation of the heart. Coffees of different characters vary in the quantity of caffein, the general range being from a little less than one to a little more than two per cent. The caffein is combined with a variable amount of caffeo-tannic acid approximately 15% of sugar which is in part dextrin, though largely glucose and approximately 13% of fat and an equal amount of proteids, with volatile oils. The fat is presumed to be of the olein and palmatin order. The caffein of coffee exists in a partially free state and in combination with caffeic acid.

It has long been a study of coffee roasters and blenders to provide a coffee which would have no deleterious effects and no harmful reactions upon those indulging in the habit of drinking the beverage and many so-called treated coffees have been produced in which the caffein or alkaloid stimulant has been almost entirely removed from the coffee-bean. Such processes, of necessity, remove the aromatic qualities and the result is a flat, unpalatable beverage having, of course, some of the characteristic flavors which result from the roasting of the beans but entirely lacking the qualities sought by the coffee drinker.

Chicory has for many years been utilized as a blend with coffees and owing to the well-known characteristics of chicory, it is quite apparent that there is a certain neutralizing effect upon the caffeins or at any rate, a reactive effect upon the user which will materially reduce the bad effects of the caffeins.

Coffee tends to degrade the appetite and interfere with the digestion and excites the liver. Chicory, on the other hand, tends to increase the appetite and promote digestion and stimulates the liver. Chicory has an unusual sharp bitter taste and it has always been impossible to use a sufficient quantity of chicory with coffee, in blending, to neutralize the effects of the caffein.

In a co-pending application, Serial No. 833,105, filed April 20, 1914, I have described a process for treating *Cichorium intybus* and like substances by which the active therapeutic value of the chicory remains, although its unpleasant qualities of taste are minimized.

I do not lay claim herein to the treatment of the chicory as this application relates entirely to the production of a coffee from which the caffein is not removed, but to which is added a sufficient quantity of specially prepared chicory or materials having the same reactive effects to neutralize the effects of the caffein and other harmful ingredients. In carrying out the invention, I use a chicory root which has been boiled under certain conditions and subsequently roasted and the quantity of the chicory employed is, of course, variable with the character of the coffee with which it is used.

The boiling of the chicory as described in my co-pending application removes the harsh bitter characteristics and thus permits the infusion of a sufficient quantity of the chicory to neutralize the effects of the alkaloid stimulants of the coffee. The aroma or flavor of the coffee is not impaired but is improved by the addition of the treated chicory as it brings out the aroma and flavor of the roasted coffee.

I lay no claim broadly to the proportion of mixture of ordinary chicory and coffee, as obviously, a sufficient infusion of ordinary chicory with the coffee would produce an unpleasant and useless beverage, one in fact, which would be almost nauseating. I do, as hereinafter set forth, claim the admixture of a treated chicory with coffee which permits leaving the entire value of the coffee and neutralizing its ill effects.

What I claim as my invention and desire to secure by Letters Patent is:

1. A coffee consisting of coffee-beans containing their full natural characteristics roasted and mixed with a vegetable root having therapeutic properties opposed to the caffein of coffee, said root being treated to remove constituents having an objectionable taste and admixed therewith after roasting in quantities sufficient to neutralize the effect of the alkaloid stimulant of the coffee without impairing the flavor of the coffee.

2. Coffee consisting of coffee beans roasted with their full natural characteristics and admixed with a vegetable root treated to extract objectionable characteristics and having therapeutic properties opposed to the caffein of coffee, said root being admixed after roasting in quantities sufficient to neutralize the effect of the alkaloid stimulant of the coffee.

3. The herein described method of treating coffee which consists in roasting the green coffee-beans, mixing therewith a vegetable root first treated to extract objectionable characteristics and with therapeutic qualities opposed to the caffein of the coffee, said root being admixed therewith in quantities sufficient to neutralize the effect of the alkaloid stimulant of the coffee.

4. A coffee consisting of coffee beans containing their full natural characteristics mixed with chicory from which the bitter characteristics have been largely removed, the mixtures being in such proportions that the alkaloid stimulant of the coffee is neutralized.

5. A coffee consisting of coffee beans containing their full natural characteristics mixed with chicory from which the bitter characteristics have been largely removed, the mixtures being in such proportions that the alkaloid stimulant of the coffee is neutralized without impairing the flavor of the coffee.

6. A coffee consisting of coffee beans containing their full natural characteristics mixed with chicory treated to remove its predominant characteristics of taste, a sufficient quantity of the treated chicory being admixed to neutralize the alkaloid stimulating effect of the coffee.

ELLIS M. POTTER.

Witnesses:
PAULA DONOHUE,
HELEN POTTER.